E. PHIFER.
Wheel-Cultivator.
No. 47,904 Patented May 23, 1865.
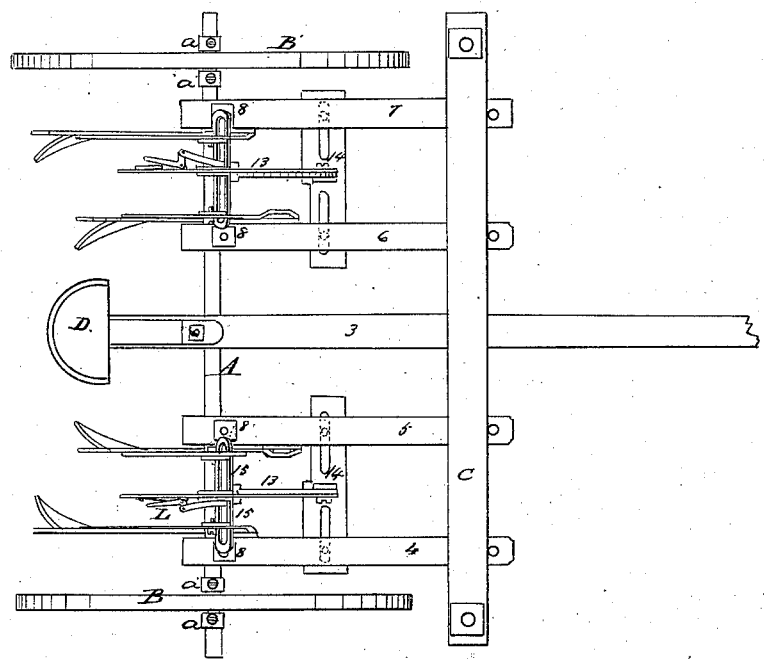
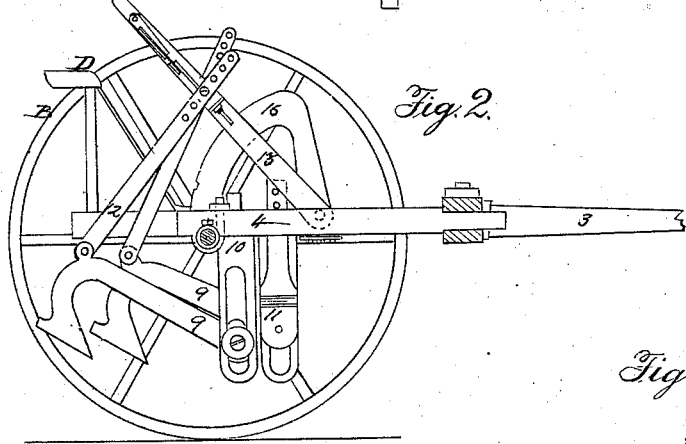
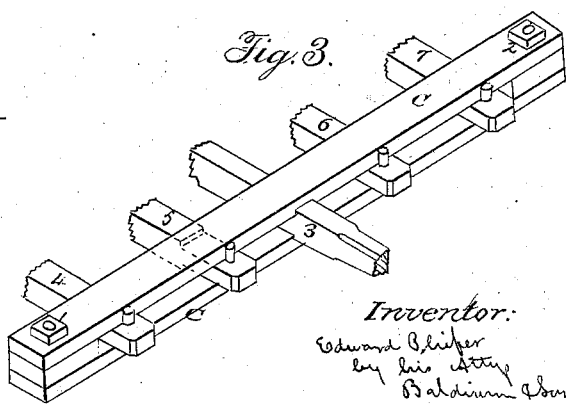

UNITED STATES PATENT OFFICE.

EDWARD PHIFER, OF TRENTON, ASSIGNOR TO HIMSELF AND JAS. M. GROVER, OF LAWRENCEVILLE, NEW JERSEY.

IMPROVEMENT IN CULTIVATORS.

Specification forming part of Letters Patent No. 47,904, dated May 23, 1865.

*To all whom it may concern:*

Be it known that I, EDWARD PHIFER, of Trenton, in the county of Mercer and State of New Jersey, have invented a new and useful Improvement in Cultivators; and I do hereby declare that the following is a full, clear, and exact description of the construction and operation of the same, reference being had to the annexed drawings, making a part of this specification, and in which—

Figure 1 is a plan view of my improved cultivator; Fig. 2, a side elevation thereof, and Fig. 3 a perspective view of the front part of the frame with the tongue and other frame-pieces broken off.

As hitherto constructed the many-toothed two-wheeled cultivator has been found inadequate to a variety of work, or to different crops in their varied condition of growth.

Now, it is the object of my invention to render the many-toothed two-wheeled cultivator easily adjustable in all its parts to render the same machine adaptable with facility to the culture of any crop planted or sown in any width of drill or furrow, or to any stage of the growth of such crops as require a cultivator; and to this end my invention consists, first, in so constructing the frame and combining it with the axle that the teeth or plows of the cultivator can be arranged in any desired relation to each other, while the wheels can be adjusted to run in furrows at any distance apart; second, in combining an adjustment for the shank with an adjustment for the point of the teeth of the cultivator under such an arrangement as shall hold the teeth at two points rigidly to the ground at any depth of cultivation; third, the combination of one or more rigidly-held cultivator-teeth with an adjusting mechanism that shall enable the driver to control their operation singly or in series with precision.

In the accompanying drawings, the axle A is shown as supported on the wheels B B', which are retained at any desired distance apart by the collars $a$ $a$ on the outside of the hubs and the collars $a'$ $a'$ on the inside of the hubs, the collars being adjustable upon and fastened permanently in place by their several set-screws.

The front portion of the frame C consists of two pieces, separated at the ends by gage-blocks and firmly held together by screws and nuts 1 2. The tongue 3 is placed centrally in the space between the front pieces of the frame, and may be there secured by any suitable fastening, while its rear end passes over the center of the axle to which it can be suitably secured, and far enough back to support the driver's seat D. The remaining pieces of the frame, 4, 5, 6, and 7, are fastened at one end to the axles by straps or hooks that pass round the axle and through the pieces, and are drawn tight or released by the screw-nuts 8, while the front ends of these pieces fit neatly between the front pieces of the frame C, where they can be suitably secured by any desired fastening that is capable of being released when this position is to be changed, and tightened when they are to remain fixed. As these longitudinal frame-pieces are to carry the cultivator teeth or plows it is obvious that they may be as many in number as will give one to each tooth, or, if desired, two teeth can be attached to each piece.

When it is proposed to change the position of the frame-pieces on the axle, or the distance of the teeth apart, it will only be necessary to loosen the front of the frame-pieces and relax the nuts 8 sufficiently to permit the hooks to move on the axle, when the required adjustment can be made, and the nuts 8 being again tightened, and the front ends of the pieces refastened, the cultivator is ready for its new work, and it is obviously practicable to arrange the pieces at an angle to the tongue or parallel therewith, as desired. By these adjustments I am enabled to change the plows so as to work advantageously with the same cultivator on either side or on both sides of the growing crop without injury to the plants at varying stages of their growth. For example, in the culture of potatoes, when the plants are just above the ground, the teeth can safely work close, or when the tops are full grown the teeth can be set so wide apart as to do them no injury.

The shank 9 of the cultivator-tooth is rendered adjustable by a slotted plate, 10, of strength sufficient to support the workingstrain of the tooth, being securely attached to the cross-piece of the frame 4 and projecting below the frame. Within the slot of the plate 10 a slide-clasp, 11, moves vertically, and has holes at various distances apart, near its upper end, to receive a screw to hold it in a fixed position, while its lower end is pinned below a clasp and embraces the end of the shank 9, which is secured between the faces of the clasp by a belt, rivet, or screw, that will permit it a slight vibration. When the slotted plate 10 is in position the sliding of the clasp 11 within its slot will of course control the end of the shank 9 and retain it at any elevation desired. The tooth is rendered adjustable by a fixed strap, 12, one end of which is secured to the back of the tooth by a flexible joint, while the other end is attached to a lever, 13, having its fulcrum on a slotted plate, 14, fastened to the cross-pieces of the frame, where it is adjustable by set-screws. The attachments of the strap 12 need not necessarily be made directly to the lever 13. I have shown in the drawings that it may be attached by an angular piece, 15, in which it can be adjusted nearer to or farther from the lever 13, and two straps can be so adjusted on the same lever when desired. The lever 13 moves on a sector, 16, which is notched on its perimeter, and the lever carries a spring-catch with a handle, 17, that retracts the catch when pressed, but the catch holds the lever steady when in place. Now, the lever being near the driver's seat he can at pleasure raise or lower the cultivator-teeth or plows, and as their connections with the frame are all rigid the teeth will always cultivate to the depth required, and can be made to run in the ground at any angle best calculated for the particular condition of the ground or crop. It is obvious that this arrangement for the adjustment of the position of the plows may be equally well applied to them singly or in pairs, and that any desired number can be advantageously placed on the same machine, and all be completely under the driver's control.

What I claim as my invention, and desire to secure by Letters Patent, is—

1. The combination, in a cultivator, of longitudinal frame-pieces adjustable at both ends to cultivate any width of row with an axle on wheels adjustable to any width of furrow, substantially as and for the purpose described.

2. The combination of an adjustable frame with one adjustment for the tooth, with a separate adjustment for the shank when both are flexible when changing the position of the cultivator-tooth, and rigid when the tooth is at work, substantially as and for the purpose described.

3. The combination, in the cultivator, of one or more rigidly-held teeth or plows with an adjustable mechanism, substantially as described, whereby the driver can control at pleasure the operation of the teeth singly or in series, as set forth.

In testimony whereof I have hereunto subscribed my name.

EDWARD PHIFER.

Witnesses:
 ALFRED E. GROVER,
 SAML. EVANS.